Nov. 2, 1926.
A. J. DOTTERWEICH
1,605,652
APPARATUS FOR SOFTENING WATER
Filed May 19, 1925    2 Sheets-Sheet 1
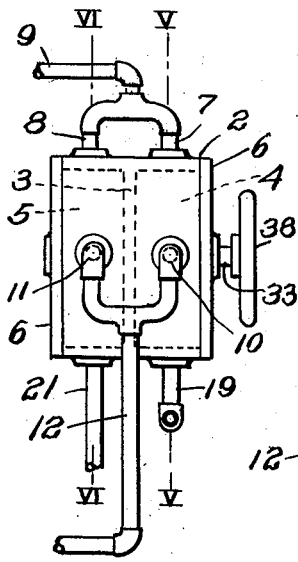
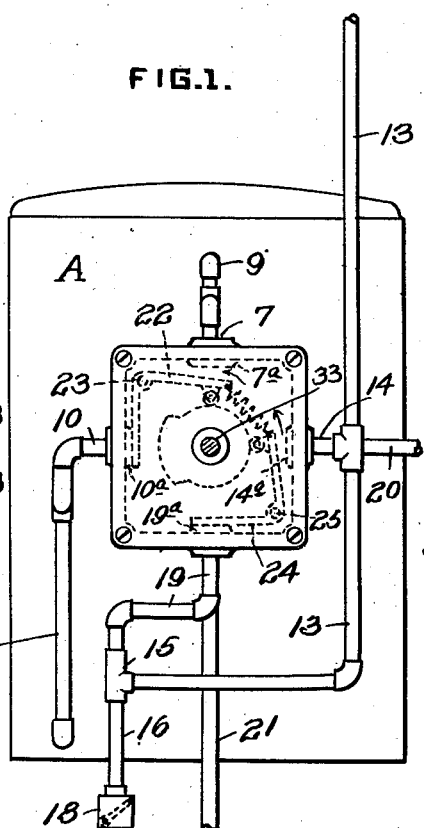
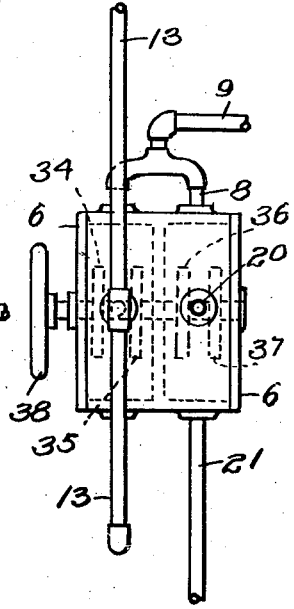
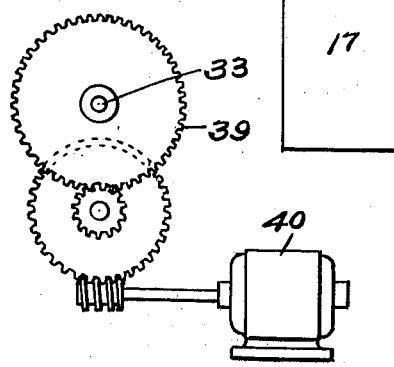
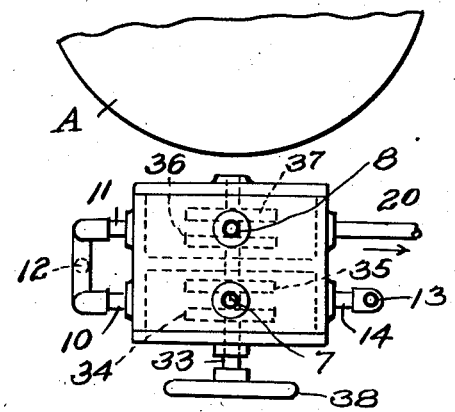
WITNESSES
INVENTOR
Andrew J. Dotterweich

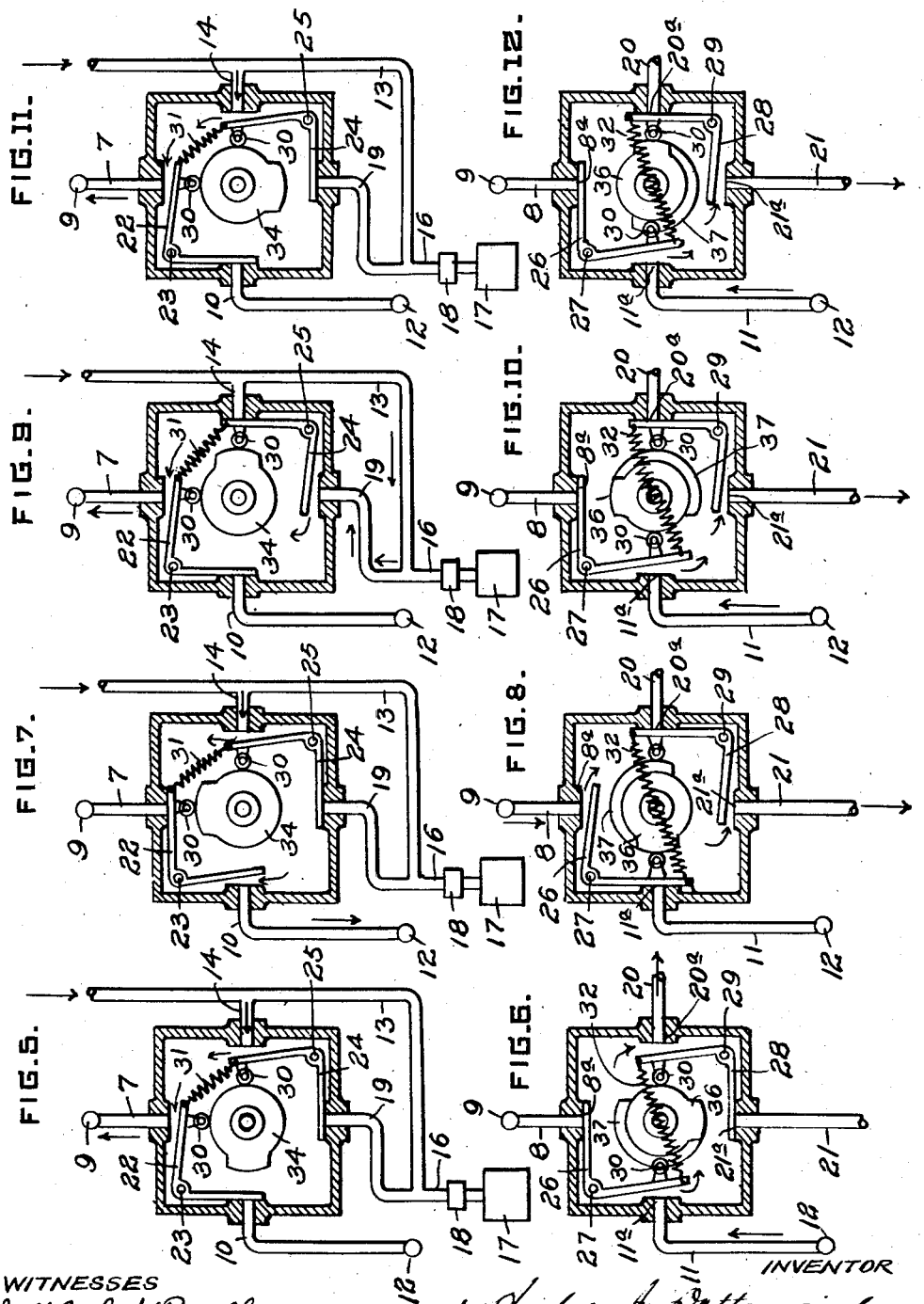

Patented Nov. 2, 1926.

1,605,652

UNITED STATES PATENT OFFICE.

ANDREW J. DOTTERWEICH, OF PITTSBURGH, PENNSYLVANIA.

APPARATUS FOR SOFTENING WATER.

Application filed May 19, 1925. Serial No. 31,313.

My invention relates to improvements in apparatus for softening water, and especially to that type utilizing a material such as zeolite, capable of being regenerated.

The improvement here involved provides means for controlling the circulation through the softening medium or chamber whereby the several operations of softening, removing foreign matter from the softening material, regenerating the zeolite, and washing or cleaning subsequent to regeneration, with resumption of softening, are performed in due sequence.

The circulation, in effecting these several operations, is controlled through a valve mechanism, constructed and adapted to operate, as hereinafter more fully described.

In the drawings, showing certain preferred embodiments of the invention:

Fig. 1 is a view of the circulating control mechanism in front elevation;

Fig. 2 is an edge view of the valve casing from the left side;

Fig. 3 is a similar view from the opposite side;

Fig. 4 is a plan view of the valve casing;

Figs. 5, 7, 9 and 11 are vertical sectional views on the line V—V of Fig. 2, showing successive positions of the cam controlled valves in one chamber of the casing.

Figs. 6, 8, 10 and 12 are similar views on the line VI—VI of Fig. 2, showing corresponding positions of the cam controlled valves in the other chamber of the casing;

Fig. 13 is a diagrammatic view, showing continuous power application to the cam shaft.

The main chamber A, of well known construction, contains the softening material, as zeolite, through which the raw or hard water is circulated in the usual manner. As is well understood in the art, and as practiced by me in carrying out the operation disclosed in prior application filed January 19, 1924, Serial No. 687,340, the several attendant operations are performed in proper sequence. These, in the order of their performance, are:

(a) Softening, i. e., passing the hard water downwardly through the contained body of zeolite.

(b) Backwashing, i. e., passing hard water upwardly or in reverse flow through the zeolite, for cleansing and breaking up of the mineral, and thence to the drain as waste.

(c) Salting, i. e., passing hard water with a contained brine solution downwardly through the zeolite and thence to the drain.

(d) Reflushing, by passing fresh water through the softening chamber downwardly through the zeolite and outwardly to the drain.

These several sequential steps comprise a cycle of operations from the commencement of softening treatment to the removal of the soft water from the zeolite.

Softening continues until the material has become ineffective, whereupon, the second operation, backwashing, effects its loosening and mechanical cleaning or flushing. During the softening operation, the water hardening elements, i. e., lime and magnesium, are eliminated from the water by the substitution of sodium therefor, and by reaction of these elements. After the backwashing, the material is regenerated by passing salt water through the material to provide for replacement of the lime and magnesium by the sodium, and finally the salt water is removed from the zeolite, when it is again ready to effect softening by passing hard water through it, as stated.

Heretofore, these various operations have been effected either manually or automatically through various controlling and actuating mechanisms and connections, and a plurality of controlling valves to establish the several circulating currents by opening and closing certain of such valves, dependent on the circulation desired.

In describing the construction and operation of the present invention, the cycle of operations covering the four steps above noted, $a$, $b$, $c$ and $d$, should be borne in mind.

In my present invention, I control the several circulating currents through a double sided valve casing. Through one side of said casing, current is supplied to the chamber for (a) softening, (b) backwashing, (c) salting, and (d) reflushing, respectively. Through the other side, a current of (a) softened water is delivered to the supply line and (b) backwash water, (c) salting water, and (d) re-flushing water are delivered to the drain.

Said valve casing is mounted in any convenient position as on the front of the main softening chamber, and the various circulating pipe connections lead to the interior thereof and terminate in valve seats. These are opened and closed by a system of opening and closing valves, which in turn are actuated in proper sequence through a single controlling stem and a plurality of cams thereon, as hereinafter described.

The valve casing 2, of suitable construction, has a middle vertical partition 3 dividing its interior into two side-by-side front and rear chambers 4 and 5, closed by outer plates 6, 6. From the upper wall of casing 2 are branch pipes 7, 8, connected by a Y-coupling from chambers 4 and 5, with a common pipe 9 leading to the upper portion of casing A. In the same way, branch pipes 10, 11, connect chambers 4 and 5 with a common pipe 12 leading to its lower portion.

Raw or hard water is furnished to chamber 4 by feed pipe 13 and branch 14, and feed pipe 13 is also connected with the salt ejector 15 of the brine supply pipe 16. Said pipe leads upwardly from brine tank 17 through check valve 18, and is connected above the ejector with the bottom of front chamber 4 by brine supply pipe 19.

A soft water delivery pipe 20 leads from rear chamber 5 at the side opposite connection 11 and a drain delivery pipe 21 leads downwardly from the bottom of chamber 5 opposite connection 8. The several connections just described communicate with the interior chambers 4 and 5 respectively through valve seated openings $7^a$, $10^a$, $14^a$ and $19^a$, respectively, as to chamber 4; and with openings $8^a$, $11^a$, $20^a$ and $21^a$, respectively, as to chamber 5.

Valve seats $7^a$ and $10^a$ of chamber 4 are opened and closed by an L-shaped valve 22 pivoted at 23. Valve seats $14^a$ and $19^a$ are opened and closed by a similar valve 24 pivoted at 25. Valve seats $8^a$ and $11^a$ of chamber 5 are opened and closed by a similar valve 26 pivoted at 27. Valve seats $20^a$ and $21^a$ are opened and closed by a similar valve 28 pivoted at 29.

These valves, as shown, are arranged in pairs, one pair for each chamber, each adapted to control a corresponding pair of valve seats, and to open one seat of each pair when the other is closed, and vice versa.

Each of said several valves 22, 24, 26 and 28 is provided with an abutment or roller 30 adapted to be held in operative contact with the edge of its actuating cam by a connecting spring 31 or 32. Mounted on a common rotating shaft 33 are the several actuating cams 34, 35, in chamber 4, and 36, 37, in chamber 5. As shown, cams 34 and 35 are in duplicate and registering position with the active portion of the cams side by side, and cams 36 and 37 have their active portions extending in opposite directions.

It will be understood, however, that the arrangement of the cams, the degree of their active projecting portions, their mounting on shaft 33, the location of abutments 30 on one arm or the other of the valves, the arrangement or form of springs 31 and 32, or other details of the cam actuating mechanism, may be varied to suit varying conditions of use as to time of flow through the various ports, order of rotation, etc., as desired.

The cams are rotated by any suitable means through their shafts 33, which is mounted in proper packed bearings in the middle wall 3 and cover plates 6, 6. I have shown a hand wheel 38 which may be used for manual operation, or, if preferred, a gear wheel 39 may be driven through gearing connected with a controlled motor 40, as in Fig. 13.

The operation of the invention will be readily understood from the foregoing description. Rotation of the stem 33, either intermittently, or continuously at slow speed, will actuate the valves individually in proper sequence by engagement of abutments 30 by the raised portions of the cams, closing, for instance, ported valve seat $7^a$ and opening ported valve seat $10^a$. Reverse movement and alternate opening and closing is effected by springs 31 and 32 when the active portion of either cam passes beyond either abutment.

With ports $7^a$ and $14^a$ of chamber 4 and ports $11^a$ and $20^a$ of chamber 5 open, as in Figs. 5 and 6, the valves are set for (a) softening. In such position, hard water from supply line 13—14 enters chamber 4 through port $14^a$ and passes out through port $7^a$, and branch line 7, through pipe 9, to the upper portion of chamber A. The water passes downwardly through the contained mineral to the bottom, and thence outwardly and upwardly through pipe 12 and branch 11, through port $11^a$, to chamber 5, and through port $20^a$, to delivery pipe 20.

With the valves in the positions shown in Figs. 7 and 8 for (b) backwashing, the water from supply line 13—14 enters chamber 4 through port $14^a$, passes outwardly through port $10^a$ to branch 10, downwardly through pipe 12, to the bottom of chamber A, thence upwardly through the mineral, outwardly through pipe 9 and branch 8, through port $8^a$, to chamber 5, then outwardly through port $21^a$, to drain pipe 21.

With the valves in the position of Figs. 9 and 10 for the (c) salting operation, raw water is supplied by pipe 13 to ejector 15, by action of which brine is carried up from tank 17 through check valve 18 and delivered by pipe 19 through port $19^a$, to chamber 4, thence outwardly through port $7^a$, branch 7, and pipe 9, to upper portion of casing A, downwardly through the mineral, then upwardly through pipe 12, and branch 11, through port 11ª, to chamber 5, and outwardly through port 21ª, to drain pipe 21.

With valves set as in Figs. 11 and 12 for (d) flushing, water from line 13—14 enters chamber 4 through port 14ª, thence by port 7ª and branch 7 and pipe 9, to the upper portion of casing A. The water passes downwardly through the contents, then upwardly by pipe 12, branch 11, through port 11ª, to chamber 5, and by port 21ª to drain pipe 21.

The construction and operation of the invention will be readily understood from the foregoing description. The timing of each cycle unit circulation may be easily controlled by the cam proportions, mounting of the several cams with relation to each other, speed of rotation, etc. The valve mechanism is capable of variation in design or detail construction, and the various connecting and circulating conduits may be changed or re-arranged within the judgment or discretion of the designer or operator. All such changes, however, are within the scope of the following claims.

What I claim is:

1. Circulation controlling means for water softening apparatus consisting of a casing having valve-controlled conduits leading thereto and therefrom, a plurality of double-acting valve members each having a pair of seats for opening and closing adjacent conduits within the casing, and means within the casing for actuating the valves.

2. Circulation controlling means for water softening apparatus consisting of a casing having valve-controlled conduits leading thereto and therefrom, a plurality of double-acting spring retracted valve members each having a pair of seats for opening and closing adjacent conduits within the casing, and means within the casing for actuating the valves.

3. Circulation controlling means for water softening apparatus consisting of a casing having valve-controlled conduits leading thereto and therefrom, a plurality of double-acting valve members each having a pair of seats for opening and closing adjacent conduits within the casing, a spring connecting opposite valve members, and means within the casing for actuating the valves and provided with external operating mechanism.

4. Circulation controlling means for water softening apparatus consisting of a double chambered casing having valve controlled conduits leading into and from each chamber, a series of pairs of double-acting valve members in each chamber each controlling two such conduits, cams therefor, and a cam shaft extending transversely of the chambers provided with an external operating device.

5. Circulation controlling means for water softening apparatus consisting of a double chambered casing having valve controlled conduits leading into and from each chamber, a series of pairs of double-acting valve members in each chamber, cams therefor, reacting springs connecting opposite valve members, and a cam shaft extending transversely of the chambers provided with an external operating device.

6. Circulation controlling means for water softening apparatus consisting of a double chambered casing having valve controlled conduits leading into and from each chamber, a plurality of pivoted valve members in each chamber each adapted to alternately open and close two of said conduits, valve actuating cams in each chamber, and a transverse cam shaft having external operating means.

7. In circulation controlling means for water softening apparatus, the combination of a double chambered casing having valve seated conduits leading into and from each chamber and consisting of two sets of four each arranged on common transverse front and back planes, series of valve members in each chamber each having an opening and closing valve portion operable to alternately open and close adjacent conduits, operating cams therefor within the casing, and a spring for each valve member acting in opposition to the cam action.

8. In circulation controlling means for water softening apparatus, the combination of a double chambered casing having valve seated conduits leading into and from each chamber and arranged in correspondingly located series therein, with certain of said conduits having a common connecting conduit, a plurality of pivoted valve members in each chamber each having two terminals for two adjacent conduits, operating cams therefor within the casing, and a spring for each valve member acting in opposition to the cam action.

9. In circulation controlling means for water softening apparatus, the combination of a double chambered casing having valve seated conduits leading into and from each chamber and arranged in correspondingly located series therein, with certain of said conduits having a common connecting conduit, a plurality of pivoted valve members in each chamber each having two terminals for two adjacent conduits, operating cams therefor within the casing, and a spring connecting one such valve member with a similar opposite valve member.

In testimony whereof I hereunto affix my signature.

ANDREW J. DOTTERWEICH.